Nov. 16, 1954  G. H. JOHNSON  2,694,806
MUTED HORN ASSEMBLY FOR VEHICLES
Filed July 28, 1951
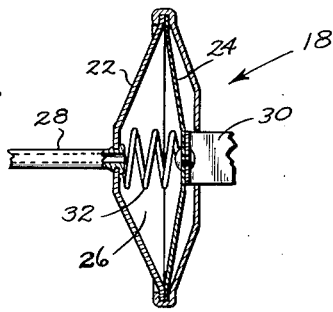
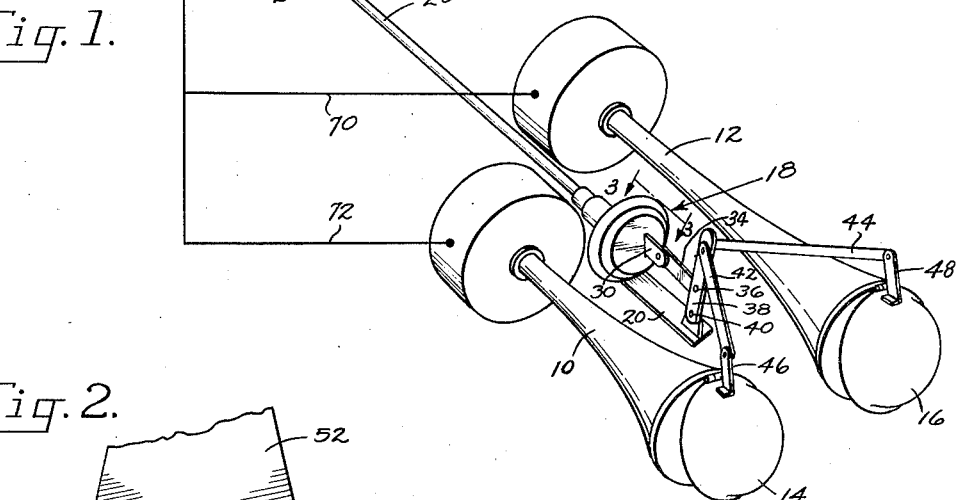
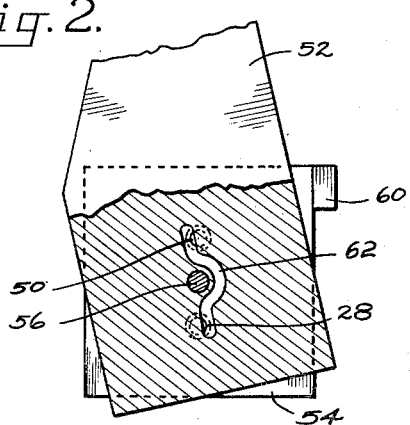
INVENTOR.
Glen H. Johnson
BY
Atty.

United States Patent Office 2,694,806
Patented Nov. 16, 1954

2,694,806

MUTED HORN ASSEMBLY FOR VEHICLES

Glen H. Johnson, Los Angeles, Calif.

Application July 28, 1951, Serial No. 239,097

5 Claims. (Cl. 340—404)

The present invention relates to a muted horn assembly for use particularly on passenger automobiles, trucks and buses. The apparatus is broadly applicable, however, to any type of vehicle such as boats, diesel locomotives and like vehicles of the class provided with horns and a source of motive fluid for a fluid-operated or pneumatic motor.

It is a primary object of the present invention to provide a horn assembly which may be controlled to operate softly or loudly at the will of the operator as circumstances dictate or necessitate.

It is another important object of the present invention to provide a muted horn assembly for vehicles wherein the mute may be operated contemporaneously with the energization of the horn.

It is a further object of the present invention to provide a muted horn assembly for vehicles by means of which novel and pleasing tonal effect may be achieved.

Another object of the present invention is the provision of a muted horn assembly for vehicles wherein the horn may be operated either in the normal manner or muted, as desired.

Still another object of the present invention is the provision of a muted horn assembly which is simple and inexpensive in construction and which is readily adaptable for application to any of the conventional types of vehicles.

The manner in which the foregoing and other objects of the present invention are accomplished will be apparent from the accompanying specification and claims considered together with the drawings wherein like numerals indicate like parts and wherein:

Figure 1 is a view in perspective of the presently described muted horn assembly;

Figure 2 is a detailed sectional view taken along the line 2—2 of Figure 1 and illustrating the valve means for operating the mute on the presently described horn assembly; and Figure 3 is a detailed sectional view taken along the lines 3—3 of Figure 1 and illustrating the construction line 3—3 of Figure 1 and illustrating the mute of the presently described horn assembly.

Generally stated, the muted horn assembly of my invention comprises one or more horns which may be electric horns such as are found on the conventional passenger car. A mute is mounted in operative position on each of the horns and a pneumatic motor is provided for opening and closing the mute. This preferably is a vacuum motor which is connected through the vacuum line through a valve.

The valve employed for operating the pneumatic motor comprises a pair of relatively movable plates mounted in face to face relationship to each other. Through one of the plates are a pair of spaced apart perforations which are connected to the respective sides of the vacuum line. The other of the plates has a channel which in one relative position of the plates interconnects the openings through the other of the plates, thereby completing the fluid circuit to the pneumatic motor. In the other of its relative positions the second plate cuts off this connection, thereby rendering the motor inoperable.

To coordinate the actuation of the horn with the action of the mute, a first switch member may be placed on one of the plates and a second switch member on the other of the plates, these two switch members being stationed in such a manner that when the passageway through the plates is completed, the electric circuit to the horn is made. Preferably, the two switch members have a construction such that upon relative movement of the plates the electric circuit is completed before completion of the fluid circuit. Hence, the horn may be operated in a normal manner unless the plates are adjusted to the particular position in which the fluid circuit is completed, whereupon the mute and the horn may be operated simultaneously.

Considering the present invention in greater detail and with particular reference to the drawings:

In the illustrated embodiment there are depicted a pair of electric automobile horns 10—12 which are suitably mounted upon the vehicle through brackets of conventional construction and not illustrated. Pivotally attached to the mouth of each horn is a mute, these being indicated respectively at 14 and 16. It will be apparent that when the mutes are separated from the mouths of the horns the latter give out their normal tones. However, as the mutes are closed, the tones of the horns become progressively muffled.

The mutes 14—16 are operated by means of a pneumatic motor 18 mounted on bracket 20 which, in turn, may be attached to the frame of the vehicle. Motor 18 preferably is a pneumatic motor of the class operated by vacuum and having a construction similar to that illustrated in Figure 3. Thus, it may comprise an outer container 22 which is divided into two chambers by means of a flexible diaphragm, e. g. rubber membrane 24. One of these chambers, i. e. chamber 26 is substantially sealed from the atmosphere and communicates with a conduit 28.

The other of the chambers need not be sealed from the atmosphere. It houses in part a shaft or piston rod 30 which is attached to the diaphragm 24 and reciprocates in an axial direction with the movement of the latter. A helical spring 32 or other resilient means is provided for returning shaft 30 to its normal position after it has been displaced by movement of diaphragm 24.

The fluid operated motor 18 is connected to the mutes through a suitable linkage comprising the link 34 which is pivotally connected through pin 36 to the lever arm 38. The latter in turn is pivotally connected at one of its ends to bracket 20 through pivot pin 40. Arms 42, 44 are pivotally connected to the posts 46, 48, these in turn being affixed respectively to mutes 14 and 16. Hence it will be apparent that as piston or shaft 30 reciprocates in the direction of its longitudinal axis mutes 14 and 16 will open and close.

The motor 18 is driven by any suitable source of fluid, preferably air, exerting pressure on one side or the other of diaphragm 24. In the illustrated embodiment conduit 28 connects with conduit 50 which in turn communicates with the vacuum tank of the vehicle, suitable valve means being included in the line for operating the motor.

In its preferred form, the valve means comprises a pair of plates 52, 54, mounted for relative movement in their respective planes through pivot pin 56. One of the plates, i. e. plate 54, may be rigidly attached to the frame of the vehicle. The other then may be provided with a lever arm or handle 58 by means of which it may be moved relative to the first plate, a stop 60 being provided to limit the extent of its movement.

Plate 54 has transversely therethrough a pair of spaced apart openings. Through one of these extends conduit 50 and through the other extends conduit 28. Plate 52 is appropriately recessed so that a channel 62 is formed therein. This is adapted to interconnect conduits 28—50 when the plate 52 is in a selected position with reference to plate 54, i. e. when it rests against stop 60.

It will be apparent that when this connection is complete, vacuum will be applied to chamber 26. This will draw diaphragm 24 of the pneumatic motor toward the left against the tension of spring 32 retracting piston rod 30 and opening the mutes. However, when plate 52 is adjusted through lever 58 so that channel 62 no longer interconnects conduits 28 and 50, then spring 32 will return diaphragm 24 to its normal position. This action will extend piston 30, closing the mutes and muffling the horns.

To coordinate the operation of the horns with the operation of the mutes there is provided an electric switch, one member 63 of which is mounted on plate 52 and the other member of which comprises an electrically conducting contact finger 64 mounted on plate 54 or in other suitable location. The contact member mounted on plate 52 is connected to a source of electric circuit through conductor 66. Conducting finger 64 is connected to the horn motors through conductors 68, 70 and 72.

The horn motors being grounded, it will be apparent that when finger 64 contacts member 63 a circuit will be completed so that the horns operate. Contact member 63 has, however, a substantial area as compared with the dimensions of channel 62 in plate 52. Therefore, plate 52 may be stationed in such a manner that when finger 64 first contacts member 63, the horns will blow but channel 62 will still be separated from conduits 28 and 50 and the mutes therefore will be inoperative. However, continued rotation of plate 52 in a clockwise direction until it engages stop 60 will complete the fluid circuit between conduits 28 and 50 while still maintaining the electric circuit closed.

Thus it will be possible to operate the horns in their normal open position, or to operate them muted, as desired. Furthermore, by connecting and disconnecting conduits 28 and 50 while maintaining the electric circuit completed, certain tonal effects of the horns may be achieved. These may be varied by still further varying the rate of movement of plate 52 as channel 62 approaches the ends of conduit 28 and 50, thereby varying the rate at which vacuum is applied to motor 18 and the rate at which the mutes are operated.

Hence it will be apparent that I have provided an effective device for muting the horns of automobiles and other vehicles which device is coordinated with the means employed for operating the horns and by means of which a wide variety of tonal effects may be achieved. The apparatus is, furthermore, simple in construction and adaptable for application to any of the usual types of vehicles on which electric horns conventionally are installed.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A muted horn assembly for use on vehicles of the class provided with conduit means containing air or other gaseous material at pressures different from the prevailing atmospheric pressure, said assembly comprising a horn, a mute, pivot means for pivotally attaching the mute to the horn outlet, a pneumatic motor connected to the mute and communicating with the conduit means for opening and closing the mute, and control valve means in the conduit means for modifying the gaseous pressure therein, thereby operating the pneumatic motor and pivoting the mute to a fixed position relative to the horn.

2. A muted horn assembly for use on vehicles of the class provided with conduit means containing air or other gaseous material under vacuum, said assembly comprising a horn, a mute, pivot means for pivotally attaching the mute to the horn outlet, a vacuum motor connected to the mute and communicating with the conduit means for opening and closing the mute, and control valve means in the conduit means for modifying the pressure therein, thereby operating the vacuum motor and pivoting the mute to a fixed position relative to the horn.

3. A muted horn assembly for use on vehicles of the class provided with a vacuum line, said assembly comprising a horn, a mute, pivot means for pivotally attaching the mute to the horn outlet; a vacuum motor connected to the vacuum line of the vehicle, the vacuum motor comprising a casing, a resilient diaphragm dividing the casing into two chambers, the first of said chambers being substantially air tight and communicating with the vacuum line, and a shaft attached to the diaphragm and extending outwardly from the casing; lever arms interconnecting the shaft of the vacuum motor and the mute for opening and closing the same, conduit means interconnecting the said first chamber of the vacuum motor and the vacuum line, and control valve means in the conduit means for operating the vacuum motor and pivoting the mute to a fixed position relative to the horn.

4. A muted horn assembly for use on vehicles of the class provided with an electric system and conduit means containing air or other gaseous material at a pressure different from the prevailing atmospheric pressure, said assembly comprising an electric horn, a mute, pivot means for pivotally attaching the mute to the horn, a pneumatic motor communicating with the conduit means of the vehicle for opening and closing the mute, valve means in the conduit means for modifying the pressure therein, thereby operating the pneumatic motor and pivoting the mute to a fixed position relative to the horn, and an electric switch included in the electric system of the vehicle and operable by the valve means, thereby actuating the switch and operating the horn while contemporaneously actuating the valve and operating the mute.

5. The muted horn assembly of claim 4 wherein the valve means comprises a pair of plates in face to face relationship to each other and mounted for relative movement in the plane of the plates, one of the plates having a pair of spaced apart perforations connected to said conduit means and bearing a first switch member, and the other of said plates having a channel adapted to interconnect the openings in the first plate thereby connecting the pneumatic motor with the conduit means, the second plate carrying also a second switch member adapted to contact the first switch member upon relative movement of the plate, thereby completing the electric circuit to the horn, the switch members being proportioned to make mutual contact over the range of relative movement of the valve plates between the open and closed positions of said valve, whereby the horn remains energized during movement of the mute between its maximum limits.

References Cited in the file of this patent
UNITED STATES PATENTS

| Number | Name | Date |
| --- | --- | --- |
| 1,057,752 | Manson | Apr. 1, 1913 |
| 1,992,628 | Oishel et al. | Feb. 26, 1935 |
| 2,265,132 | Fultz | Dec. 9, 1941 |
| 2,301,344 | Tibbetts | Nov. 10, 1942 |
| 2,436,603 | Ritchey | Feb. 24, 1948 |